Figure 2:
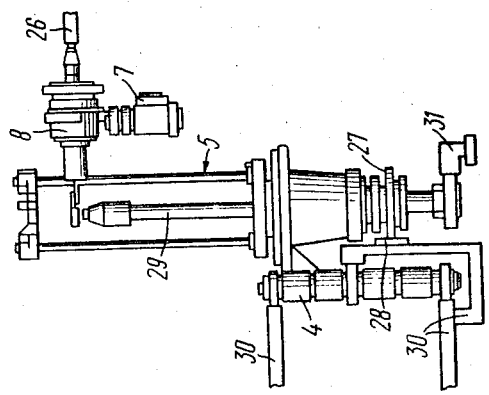

United States Patent [19]

Alexandrov et al.

[11] 3,728,005

[45] Apr. 17, 1973

[54] AUTOMATIC APPARATUS FOR WELDING UP AND EVACUATION OF ELECTROVACUUM DEVICES

[75] Inventors: Albert Ivanovich Alexandrov; Solomon Isaakovich Levin; Valery Fedorovich Chestnov; Raisa Markovna Kovaleva; Tatyana Semenovna Birjukova; Albert Ivanovich Burko; Mikhail Grigorievich Naumov, all of Saransk, MASSR, U.S.S.R.

[73] Assignee: Vsesojuzny Navchno-Issledovatelsky Institut Istochnikov Sveta, Saraush, U.S.S.R.

[22] Filed: Aug. 26, 1971

[21] Appl. No.: 175,093

[52] U.S. Cl...................................316/31, 198/19
[51] Int. Cl..................................................H01j 9/48
[58] Field of Search..................316/31; 65/146, 155; 198/162, 19; 29/25.1

[56] References Cited

UNITED STATES PATENTS 2,940,220  6/1960  Roeber..............................198/162
2,972,409  2/1961  Mullan et al. ......................65/146
3,063,709  11/1962  Williams et al........................29/25.1
3,129,043  4/1964  Rively et al.............................316/31
3,399,044  4/1968  Kolkman et al. ......................29/25.1

Primary Examiner—Charles W. Lanham
Assistant Examiner—J. W. Davie
Attorney—Eric H. Waters et al.

[57] ABSTRACT

The invention relates to an automatic apparatus for welding up and evacuation of electrovacuum devices, such as incandescent lamps.

The apparatus according to the invention is characterized in that means for welding up component parts of said devices comprises a continuously moving chain conveyor having a chain running around at least two sprockets, the chain of said conveyor supporting stations adapted to hold component parts of said devices, while means for transferring assembled devices from said means for welding up component parts to means for degasification of and filling up said devices with an inert gas also comprises a chain conveyor, the chain of said conveyor supporting means for transferring assembled devices.

3 Claims, 6 Drawing Figures

AUTOMATIC APPARATUS FOR WELDING UP AND EVACUATION OF ELECTROVACUUM DEVICES

The present invention relates to the art of manufacture of electrovacuum devices and light sources, and more specifically, to an automatic apparatus for welding up and evacuation of electrovacuum devices, and may be used, e.g., for manufacturing general purpose incandescent lamps.

Known in the art are automatic apparatus for welding up and evacuation of electrovacuum devices, comprising means for welding up component parts of said devices, which is provided with stations for holding said component parts, means for feeding component parts of a device, means for assemblying a device of a predetermined shape of said component parts, means for degasification of and filling up assembled devices with an inert gas, and means for transferring assembled devices from said means for welding up component parts to said means for degasification of and filling up said devices with an inert gas.

These prior art automatic apparatus represented periodically acting machines of the turret type, the technological steps being mainly performed at a moment, when the turret was stationary, the period of displacement (rotation) of such a turret constituting an idle time.

These prior art apparatus were deficient in that they had low output, the possibilities of increasing the output being restricted. The output of such apparatus might be increased either by increasing a number of stations on the turret, or by reducing a time of displacement (rotation) of the turret, that is a time of transfer of component parts from one station to another (the next one).

In case of an increase in a number of stations on the turret overall dimensions of an apparatus are increased resulting in important inertial loads during the rotation of turrets.

Reduction of time for rotation of turrets also results in important inertial loads which practically do not permit to increase the output of such apparatus in a considerable degree.

It is an object of the invention to eliminate the above disadvantages.

The invention consists in the provision of a high output automatic apparatus having minimum inertial loads and small overall dimensions.

This object is accomplished by that in an automatic apparatus for welding up and evacuation of electrovacuum devices means for welding up component parts of devices comprises a continuously moving chain conveyor having a chain running about at least two sprockets, said chain supporting stations for holding component parts of a device, while means for transferring assembled devices also comprises a chain conveyor, the chain of said conveyor supporting gripping means for transferring assembled devices, the chain of said conveyor moving synchronously with the chain of said continuously moving chain conveyor of said means for welding up and with means for degasification of and filling up assembled devices with an inerts gas, the chain of said conveyor for transferring assembled devices having a curvilinear portion on the side adjacent to means for degasification of and filling up assembled devices with an inert gas, a radius of said portion depending on a diameter of said last mentioned means.

It is advantageous to arrange means for feeding component parts of a device and means for assemblying devices on the sprockets of the chain conveyor of said means for welding up component parts of electrovacuum devices, a number of said means having to correspond to a number of technological steps of making a device.

It is advantageous to provide means for welding up component parts of a device with at least one additional chain conveyor, the chain of said conveyor moving synchronously with the chain of said conveyor of means for welding up component parts of a device, the chain of said additional conveyor supporting means for feeding component parts of a device and means for assemblying said devices, as well as stations adapted to accompany and to move synchronously with the stations of the conveyor of said means for welding up component parts of a device.

The automatic apparatus according to the present invention completely accomplishes the above objects.

Figure 1:
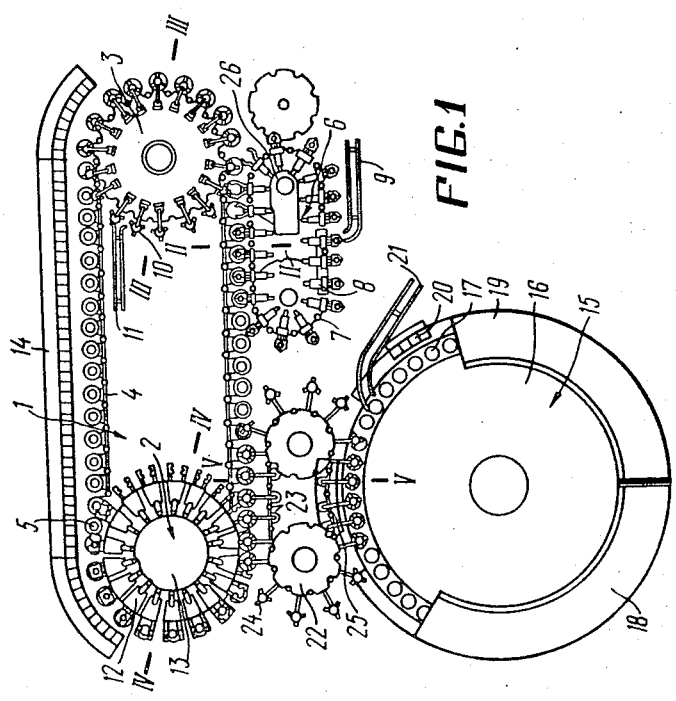
Figure 3:
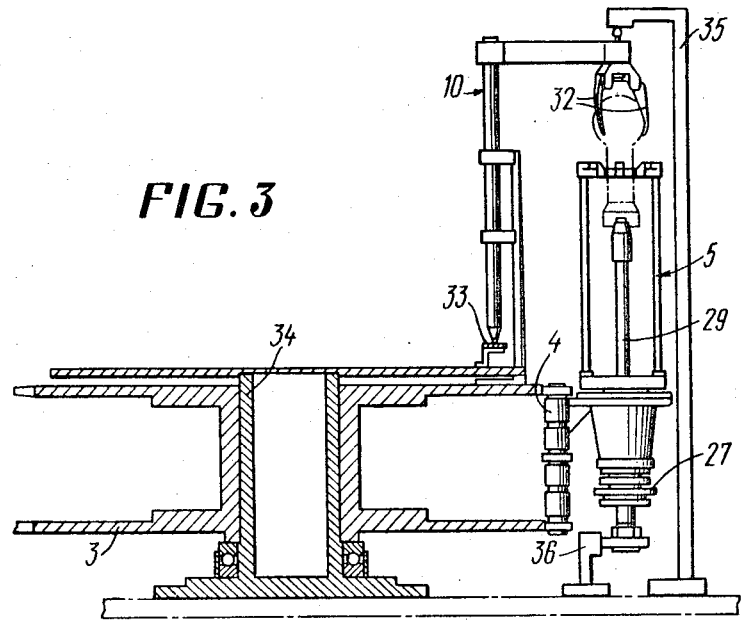
Figure 4:
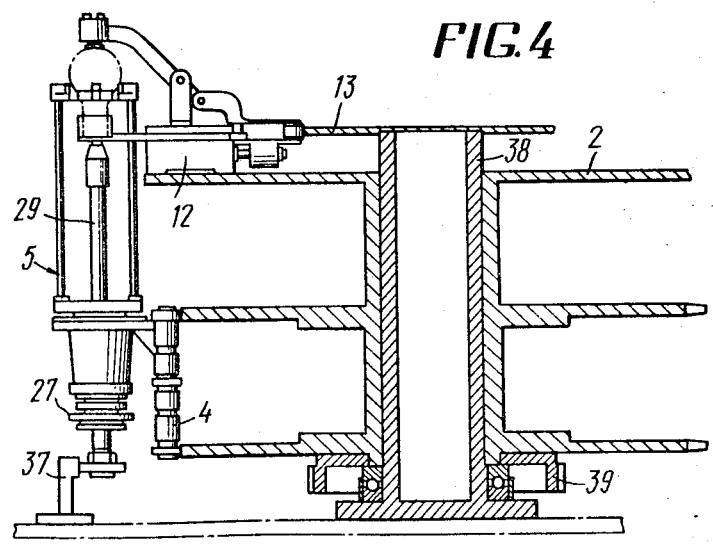
Figure 5:
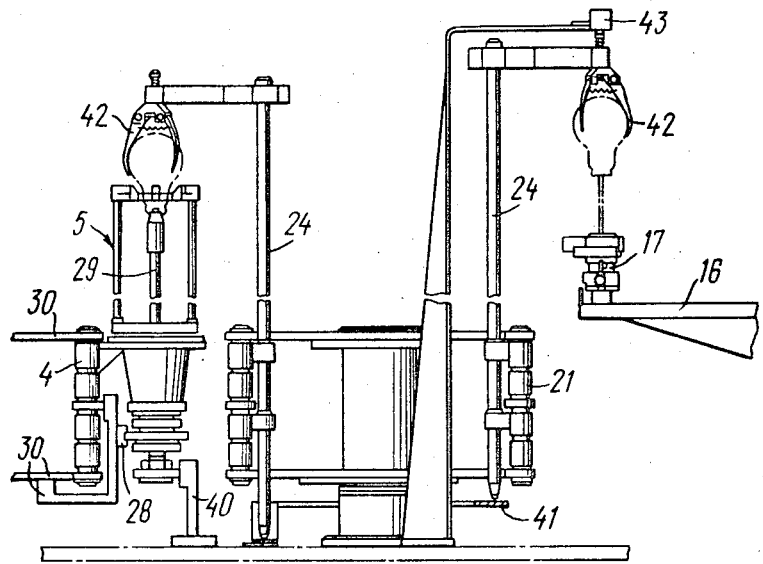
Figure 6:
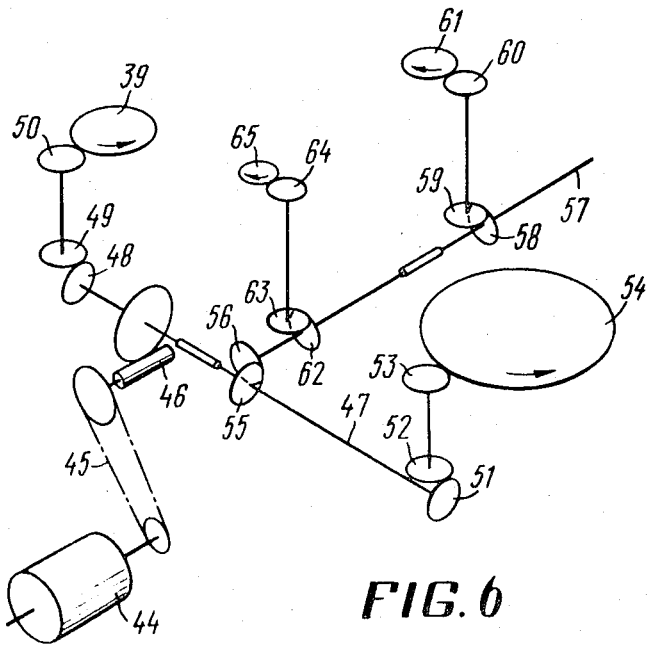

Better understanding of the invention may be had from the following detailed description of a specific embodiment thereof illustrating an automatic apparatus for welding up and evacuation of electrovacuum devices, and more particularly, incadascent lamps, with reference to the accompanying drawings, in which:

FIG. 1 schematically shows a general plan view of an automatic apparatus for welding up and evacuation of incadescent lamps;
FIG. 2 is a section along a line II—II of FIG. 1;
FIG. 3 is a section along a line III—III of FIG. 1;
FIG. 4 is a section along a line IV—IV of FIG. 1;
FIG. 5 is a section along a line V—V of FIG. 1;
FIG. 6 shows a kinematic chain of the automatic apparatus shown in FIGS. 1–5.

The illustrative embodiment of an automatic apparatus for welding up and evacuation of incadescent lamps comprises means for welding up fashioned as a chain conveyor 1 (FIG. 1) having a driving sprocket 2 and a driven sprocket 3 to drive a chain 4 of this conveyor.

Affixed to the chain 4 of the chain conveyor 1 are stations 5 disposed in equally spaced relation therebetween, said stations being adapted to hold component parts of incandescent lamps beginning from feeding thereof to the discharge of finished incandescent lamps. The apparatus also comprises another chain conveyor 6 adapted to feed one of the component parts of an incandescent lamp, namely, the stem, said conveyor comprising a chain 7 with feeding means 8 fixed thereto, which are adapted to engage the stems from a trough 9, to hold and to feed said stems to the station 5 of the conveyor 1. The trough 9 is adapted to feed the stems to a conveyor 6 piece by piece.

Mounted on the driven sprocket 3 of the chain conveyor 1 are equally spaced means 10 for feeding another component part of an incandescent lamp — the bulb, the bulbs being transferred from feeding means 10 into the stations 5 of the conveyor 1 at the moment of engagement of the chain 4 of the chain conveyor 1 with the driven sprocket 3. The bulbs are fed into feeding means 10 from a trough 11 which is adapted to feed the bulbs piece by piece.

Mounted on the driving sprocket 2 of the chain conveyor 1 are equally spaced means 12 for assemblying an incadescent lamp of a predetermined shape. Assemblying means 12 is actuated by a cam 13 of a predetermined profile rigidly fixed to the sprocket 2. Gas burners 14 are arranged along the chain conveyor 1, said burners being stationary mounted and adapted to heat component parts of an incandescent lamp (the bulb and the stem) received within the stations 5 and moving with the conveyor 1, before the lamps are assembled by assemblying means 12.

The automatic apparatus for welding up and evacuation of incandescent lamps is provided with means 15 for degasification of and filling up an incandescent lamp with an inert gas. Means 15 consists of an evacuation turret 16 provided with euqally spaced stations 17 mounted thereon. The stations 17 perform the transfer of assembled lamps during the sealing of a glass tube (exhaust tube) of a lamp, through which the evacuation of a lamp and filling it up with an inert gas are effected. Stationary mounted along the path of movement of the evacuation turret 16 with stations 17 are a degasification furnace 18 adapted to heat assembled lamps during the evacuation thereof, and a chamber 19 adapted to cool an incandescent lamp before filling it up with an inert gas.

Means 15 for degasification of and filling up incandescent lamps with an inert gas is also provided with stationary burners 20 for hermetically sealing by fusion the glass tube of a lamp through which, as it was mentioned above, the degasification of and filling up assembled lamps with an inert gas are effected, and means 21 for discharging a lamp with the fused exhaust tube.

The automatic apparatus for welding up and evacuation of incandescent lamps further comprises means 22 for transferring assembled incandescent lamps from the chain conveyor 1 into means 15 for degasification of and filling up the lamps with an inert gas. Means 22 for transferring assembled incandescent lamps also comprises a conveyor having a chain 23 with transfer means 24 for assembled lamps fixed to said chain, said transfer means receiving an assembled incandescent lamp, and transferring it at the moment, when the chain 4 is contacting with the stations 5 of the conveyor 1, and the chain 23 is contacting with means 24, and feeding an assembled lamp into stations 17 at the moment, when the chain 23 and means 24 are contacting with the evacuation turret 16 and the stations 17 respectively. Transfer means 22 for assembled lamps is provided with a cam 25 which is adapted to deflect the chain 23 of means 22, in order to ensure better engagement of this chain and means 24 with the evacuation turret 16 and the stations 17.

The stems are fed from the chain conveyor 6 into the stations 5 of the conveyor 1 by means of stationary feeding means 8, and after the stem has been fed, said feeding means releases the stem and moves in the opened position to receive the next stem from the trough 9.

Each station 5 is provided with a gear wheel 27 (FIG. 2) with a friction device (not shown in FIG. 2). The gear wheel 27 is in operative engagement with a rack 28 which is stationary mounted around the entire chain conveyor 1. During the movement of the chain conveyor 1, the stations 5 are moving therewith, and since the gear wheels 27 are engaged with the rack 28, each station 5 is rotating about its axis.

In addition, each station 5 is provided with a plug 29 adapted to hold the stem of an incandescent lamp, said plug being capable of a vertical reciprocating motion by means of an appropriate cam (not shown in FIG. 2).

In order to eliminate oscillations of the chain 4 of the chain conveyor 1, there are provided stationary guides mounted on certain portions of the chain conveyor 1.

Stationary cams 31 mounted on the conveyor 1 are adapted to prevent the stations 5 of the conveyor 1 from being rotated at the moment of feeding the stems therein.

Means 10 for feeding the bulb comprises grips 32 (FIG. 3) which are adapted to engage the bulb, to hold it during the transfer and to release the bulb at the moment of feeding it into the stations 5 of the conveyor 1. During the rotation of the driven sprocket 3, bulb feeding means 10 is performing a vertical reciprocating movement by means of a link 33 which is stationary mounted on a stationary column 34 supporting for rotation the driven sprocket 3 of the chain conveyor 1.

A stationary cam 35 mounted on the path of movement of the grips 32 is adapted to open said grips. At the moment of feeding the bulbs, a station 5 is also not rotated due to the presence of a cam 36 functioning similarly to the cam 31.

In order to prevent a station 5 from being rotated at the moment of assemblying a lamp, there is provided a stationary cam 37 (FIG. 4). The driving sprocket 2 of the conveyor 1 is rotated in a stationary column 38 by means of a gear wheel 39 rigidly secured to said sprocket and being in force transmitting connection with driving means of the apparatus, as it will become more clear from the following description of the kinematic chain of the apparatus. During the transfer of an assembled lamp from a station 5, the latter is prevented from being rotated by means of a stationary cam 40 (FIG. 5).

Means 24 for transferring assembled lamps is capable of upward and downward displacement by means of a stationary link 41 and is also provided with grips 42, which are adapted to engage, transfer and release the bulb during the feeding thereof into the stations 17 of the evacuation turret 16. At the moment, when an assembled lamp is being fed into a station 17 of the evacuation turret 16, means 24 is riding up to a stationary cam 43 to actuate the grips 42, which will open to release the lamp.

The automatic apparatus is driven by an electric motor 44 (FIG. 6) through a belt transmission 45, a worm reduction gear 46 and a distributing shaft 47.

The chain conveyor 1 is driven by the distributing shaft 47 via bevel gears 48, 49, a gear wheel 50 and the above-mentioned gear wheel 39.

The evacuation turret 16 is driven by the distributing shaft 47 via bevel gears 51, 52 and gear wheels 53, 54 (the gear wheel 54 being rigidly secured to the evacuation turret 16. From the distributing shaft 47 rotation is transmitted via bevel gears 55, 56 to a distributing shaft 57.

The chain conveyor 6 is driven by the distributing shaft 57 via bevel gears 58, 59 and gear wheels 60, 61, the gear wheel 61 and one of the sprockets of the chain conveyor 6 being rigidly connected therebetween. Transfer means 22 for assembled lamps is driven by the distributing shaft 57 via bevel gears 62, 63 and gear wheels 64, 65, the gear wheel 65 and one of the sprockets of transfer means 22 for assembled lamps being also rigidly connected therebetween (not shown in FIG. 6).

Upon energization of the electric motor 44, all mechanisms and devices in force transmitting connection therewith are actuated. The interaction of mechanisms and devices of the automatic apparatus will be better apparent when considered according to the technological sequence of operations for the production of an incadescent lamp. First, a stem is fed into the apparatus. During the movement of the chain conveyor 6 feeding means 8 engage a stem from the trough 9 by turns and transfer it to the zone, where the stations 5 of the chain conveyor 1 contact with feeding means 8 of the chain conveyor 6. In this zone the cam 26 actuates feeding means 8, which will be opened and will not hold a stem no more, the latter being supplied into a station 5 from feeding means 8. During the feeding of a stem, the plug 29 moves from the lower position to the upper position and will remain in this position until the transfer of an assembled lamp is completed.

Feeding means 8 in its opened position leave the zone of contact and move to the trough 9 to receive the next stems.

The stations 5 of the conveyor 1 with the stems received therein move to the driving sprocket 3 on which bulb feeding means 10 are mounted.

During the continuous movement of the driving sprocket 3 bulb feeding means 10 are receiving the bulbs from the trough 11 piece by piece and transferring them to the zone, where the stations 5 of the conveyor 1 contact with bulb feeding means 10. Bulb feeding means 10 are in the extreme upper position, and during further movement of transferring a bulb into the stations 5 are being shifted into the extreme lower position. During the movement, bulb feeding means 10 are riding up the stationary cam 35, which actuates the grips 32 of feeding means 10 to open them and to release the bulb. Now, the bulb is held only by the station 5. Feeding means 10 are shifted into the extreme upper position with the grips 32 being opened, and in further movement leave the zone of contact and move to the trough 11 to receive the next bulbs.

The stations 5 with the stems and bulbs received therein move to the heating zone.

During the feeding of the stems and bulbs, the stations 5 are not being rotated, but remains in oriented position by means of the stationary cams 31 and 35. In order to allow for uniform heating of the bulb and stem received in a station 5, the stations 5 are rotated in the heating zone due to the fact that a gear wheel 27 are riding along the rack 28. The bulbs and stems are heated up until the softening by means of the stationary burners 14.

In further movement the stations 5 reach the zones of contact with assemblying means 12. Assemblying means 12 enter the assemblying zones in opened position upon the actuation by means of the stationary cams 13. In the zone of contact assemblying means 12 are closed upon actuation by means of the cams 13, thereby imparting to the lamp a predetermined shape. At the moment of assemblying, the stations 5 are not being rotated, since they are riding up the stationary cam 37 which prevents the stations 5 from being rotated.

In further movement the stations 5 enter the zone of contact with means 24 for transferring assembled lamps of transferring means 22. The stations 5 are not being rotated during the lamps transfer, since they are riding up the stationary cam 40. During the engagement of the assembled lamp out of the station 5 by the grips 42 of means 24 for transferring the assembled lamps, the latter is being shifted from the extreme upper position into the extreme lower position, while after gripping the assembled lamp it is again shifted into the extreme upper position, since they ride up the stationary links 41.

Then the grips 42 of means 24 leave the zone of contact with the stations 5 to transfer the lamps, which are thus welded up, into means 15 for degasification of and filling up lamps with an inert gas, while the stations 5 of the chain conveyor 1 are moving to the chain conveyor 6 to receive the next stems.

The grips 42 of transfer means 24 in their further movement handle the assembled lamps over to the zone of contact with the stations 17 of the evacuation turret 16. In this zone means 24 is shifted from its extreme upper position again to the lower position upon actuation by the link 41, and at the same time means 24 are riding up the cam 43 which open the grips 42 and release the lamp to supply the latter into a station 17 of the evacuation turret 16. Subsequently, transfer means 24 are shifted into the extreme upper position, leave the zone of contact with the evacuation turret 16, and in further movement are fed to receive the next assembled bulb. After it, hermetical sealing of the assembled lamp in the station 17 of the evacuation turret 16 takes place followed by further treatment of the lamp according to conventional procedure, namely, evacuation thereof, filling up with a gas, welding off the stem by means of the burners 20 and the discharge of the welded off lamp by discharge means 21. At this step the process of the production of a lamp is completed.

Other embodiments of the automatic apparatus are also possible. Thus, while according to the above description stem feeding means 6 were mounted on the additional conveyor, they may be mounted on one of the sprockets of the welding-up conveyor 1; bulb feeding means 10 and assemblying means 12 may be arranged on additional conveyors moving synchronously with the conveyor 1 and having the zones of mutual contact to perform technological steps, instead of being mounted on the sprockets of the conveyor 1 as it was described above. Therefore, the feeding of component parts of lamps and treatment thereof may be performed either on additional conveyors, or on the sprockets of the main welding-up conveyor, or on a combination thereof.

We claim:

1. An automatic apparatus for welding up and evacuation of electrovacuum devices, comprising: means for welding up component parts of said device; stations adapted to hold said parts arranged on said means for wleding up said component parts; means for feeding component parts of said device; means for assemblying said device of said component parts; means for degasification of and filling up assembled devices with an inert gas; means for transferring said assembled devices from said means for welding up component parts of said device to said means for degasification of and filling up said devices with an inert gas; said means for welding up said component parts of an electrovacuum device comprising a continuously moving chain conveyor having a chain running around at least two sprockets; said stations for holding component parts of a device being mounted on said chain; said means for transferring assembled devices comprising a chain conveyor having a chain which supports gripping means adapted to transfer assembled device; said chain moving synchronously with the chain of said continuously moving chain conveyor of said means for welding up and with said means for degasification of and filling up assembled devices with an inert gas; the chain of said means for transferring assembled devices having a curvilinear portion on the side adjacent to said means for degasification of and filling up assembled devices with an inert gas; a radius of said portion depending on a diameter of said last mentioned means.

2. An automatic apparatus according to claim 1, wherein said means for feeding component parts of a device and said means for assemblying said devices are mounted on said sprockets of the chain conveyor of means for welding up component parts of a device, a number of said means corresponding to a number of technological steps for the production of a device.

3. An automatic apparatus according to claim 1, wherein said device for welding up component parts of a device is provided with at least one additional chain conveyor, the chain of said conveyor moving synchronously with the chain of said means for welding up component parts of a device, while the chain of said additional conveyor supporting said means for feeding component parts of a device and means for assemblying devices, said additional chain conveyor being provided with stations adapted to accompany and to move synchronously with said stations of the conveyor of said means for welding up component parts of a device in predetermined zones.

* * * * *